(12) United States Patent
Wielhorski et al.

(10) Patent No.: US 12,743,897 B2
(45) Date of Patent: Sep. 22, 2026

(54) METHOD FOR AUTOMATICALLY SEARCHING FOR AT LEAST ONE TEXTILE PATTERN IN A COMPOSITE MATERIAL REINFORCEMENT

(71) Applicant: SAFRAN AIRCRAFT ENGINES, Paris (FR)

(72) Inventors: Yanneck Wielhorski, Moissy Cramayel (FR); Teddy Fixy, Moissy Cramayel (FR); Julien Paul Schneider, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 684 days.

(21) Appl. No.: 18/254,752

(22) PCT Filed: Nov. 22, 2021

(86) PCT No.: PCT/FR2021/052056
§ 371 (c)(1),
(2) Date: May 26, 2023

(87) PCT Pub. No.: WO2022/112697
PCT Pub. Date: Jun. 2, 2022

(65) Prior Publication Data
US 2024/0005679 A1 Jan. 4, 2024

(30) Foreign Application Priority Data
Nov. 30, 2020 (FR) ....................................... 2012365

(51) Int. Cl.
*G06V 20/64* (2022.01)
*G06V 10/82* (2022.01)

(52) U.S. Cl.
CPC .............. *G06V 20/64* (2022.01); *G06V 10/82* (2022.01); *G06V 2201/122* (2022.01)

(58) Field of Classification Search
CPC .. G06V 20/64; G06V 10/82; G06V 2201/122; G06V 2201/12; G06V 20/00;
(Continued)

(56) References Cited

U.S. PATENT DOCUMENTS 11,703,457 B2 * 7/2023 Yang ....................... G06T 19/20 348/125
11,868,863 B2 * 1/2024 Dal Mutto ............ G06T 7/0002
(Continued)

OTHER PUBLICATIONS

International Search Report as issued in International Patent Application No. PCT/FR2021/052056, dated Mar. 10, 2022.
(Continued)

*Primary Examiner* — Michael S Osinski
(74) *Attorney, Agent, or Firm* — CUSHMAN PARTNERS, LLC

(57) ABSTRACT

A method for automatically searching for at least one given textile pattern in a composite material reinforcement including a plurality of textile patterns, each textile pattern including a plurality of reinforcing yarns arranged according to a textile topology, the method including acquiring a three-dimensional image of the composite material reinforcement, and searching for the given textile pattern in the acquired three-dimensional image, using an artificial neural network trained on a training database to detect the given textile pattern in a three-dimensional image of a composite material reinforcement.

6 Claims, 2 Drawing Sheets

(58) Field of Classification Search
CPC ........ G06N 3/045; G06N 3/0464; G06N 3/09; G06N 3/08; G06N 20/10; G06N 3/084; G06N 3/096; G01N 2021/8883; G01N 2021/0181; G01N 2021/8472; G01N 2021/8887; G01N 21/8851; G01N 2021/8444; G01N 23/04; G06T 2207/20084; G06T 7/0004; G06T 2207/30124
See application file for complete search history.

(56) References Cited

U.S. PATENT DOCUMENTS

| | | | | |
|---|---|---|---|---|
| 12,086,520 | B2 * | 9/2024 | Sieger | G06T 17/20 |
| 2014/0060392 | A1 * | 3/2014 | Koenigstein | C04B 16/0633 428/401 |
| 2016/0232653 | A1 * | 8/2016 | Hishida | G01N 21/8851 |
| 2016/0247271 | A1 * | 8/2016 | Hishida | G06T 7/0004 |
| 2017/0213357 | A1 * | 7/2017 | Hishida | G06T 7/60 |
| 2018/0322623 | A1 * | 11/2018 | Memo | G06T 7/0004 |
| 2019/0064378 | A1 * | 2/2019 | Liu | G01V 1/28 |
| 2019/0272679 | A1 * | 9/2019 | Brodsky | G06Q 30/0643 |
| 2020/0027206 | A1 * | 1/2020 | Szarski | G01N 21/8851 |
| 2021/0026338 | A1 * | 1/2021 | Yati | G06T 7/0008 |
| 2021/0350176 | A1 * | 11/2021 | Klaiman | G06F 18/214 |
| 2022/0206154 | A1 * | 6/2022 | Kotov | G01S 7/4802 |
| 2023/0113698 | A1 * | 4/2023 | Brion | G06T 7/181 382/128 |

OTHER PUBLICATIONS

Badran, A., et al., "Automated segmentation of computed tomography images of fiber-reinforced composites by deep learning," Journal of Materials Science, Computation & theory, vol. 55, No. 34, Sep. 2020, XP037244938, pp. 16273-16289.

Ali, M. A., et al., "Deep learning based semantic segmentation of µCT images for creating digital material twins of fibrous reinforcement," Composites Part A: Applied Science and Manufacturing, vol. 139, Sep. 2020, XP086315457, 7 pages.

* cited by examiner

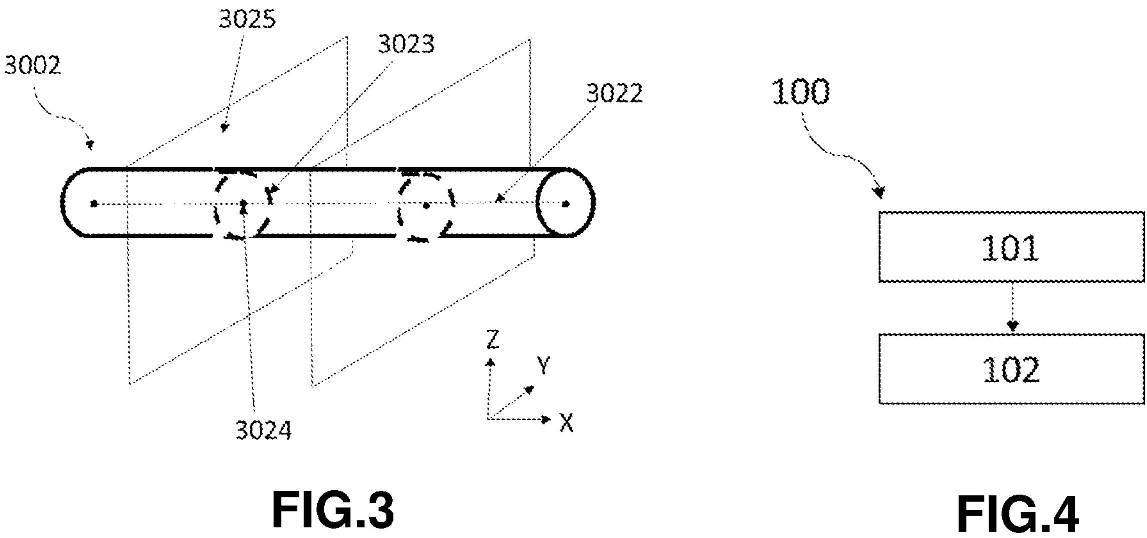
FIG.3
FIG.4
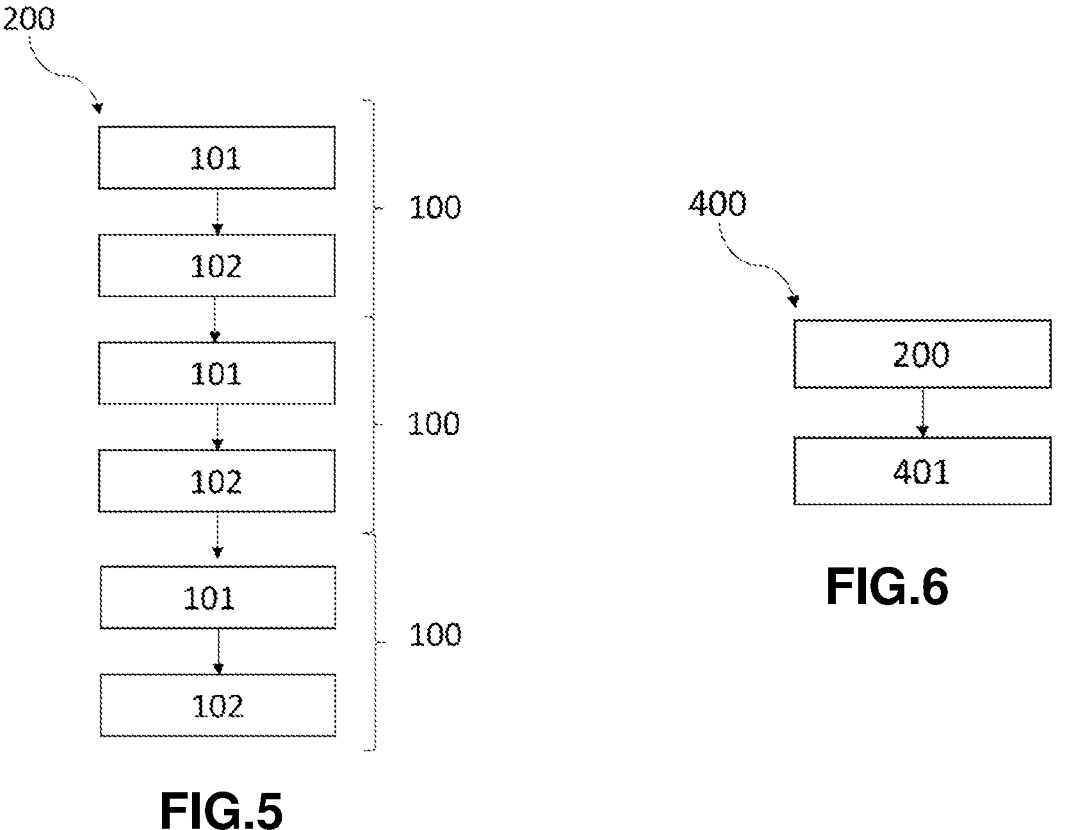
FIG.5
FIG.6

METHOD FOR AUTOMATICALLY SEARCHING FOR AT LEAST ONE TEXTILE PATTERN IN A COMPOSITE MATERIAL REINFORCEMENT

CROSS-REFERENCE TO RELATED APPLICATIONS

This application is the U.S. National Stage of PCT/FR2021/052056, filed Nov. 22, 2021, which in turn claims priority to French patent application number 2012365 filed Nov. 30, 2020. The content of these applications are incorporated herein by reference in their entirety.

TECHNICAL FIELD OF THE INVENTION

The technical field of the invention is that of composite materials and more particularly that of methods for automatically searching for textile patterns for the reinforcement of composite materials.

The present invention relates to a method for searching for at least one textile pattern in a reinforcement of composite material and in particular an automatic method for searching for at least one textile pattern in a reinforcement of composite material. The present invention also relates to a method for reconstructing the textile geometry of a reinforcement of composite material, a method for inspecting the textile geometry of a reinforcement of composite material, a computer program product and a recording medium for implementing the search method and/or the reconstruction method and/or the inspection method.

TECHNOLOGICAL BACKGROUND OF THE INVENTION

A composite material is an assembly including at least a textile framework called a reinforcement and a binder called a matrix. The manufacture of a part in a composite material therefore requires a first step of making the reinforcement, for example by weaving, and then a second step of assembling it with the matrix, for example by injection.

The reinforcement of a part is made in such a way that the textile geometry of the reinforcement conforms with a theoretical reinforcement textile geometry allowing the part to have the desired thermo-physical and/or thermo-mechanical properties. However, it is common for deviations to be noticed between the actual reinforcement geometry of the part and the theoretical reinforcement geometry. These deviations, known as textile defects, often result in a variation in the thermo-physical and/or thermo-mechanical properties of the part with respect to what was intended, and therefore lead to the systematic rejection of the part, considered as defective.

Currently, the identification of textile defects is carried out by visual inspection, which makes the operation extremely time-consuming, as a single LEAP™ vane includes several thousand carbon yarns to be inspected, and prone to many errors, as it is sometimes impossible, even with the naked eye, to distinguish textile defects.

There is therefore a need to be able to inspect conformity of the textile geometry of the reinforcement of a part with the theoretical textile geometry, with a reduced risk of errors.

SUMMARY OF THE INVENTION

The invention offers a solution to the problems previously discussed, by making it possible to accurately detect possible textile defects in the reinforcement of a part.

A first aspect of the invention relates to a method for automatically searching for at least one given textile pattern in a reinforcement of composite material including a plurality of textile patterns, each textile pattern including a plurality of reinforcing yarns arranged according to a textile topology, the method including the following steps of:

Acquiring a three-dimensional image of the reinforcement of composite material;

Searching, using an artificial neural network trained on a training database to detect the given textile pattern in a three-dimensional image of the reinforcement of composite material, for the given textile pattern in the three-dimensional image acquired.

By virtue of the invention, the artificial neural network makes it possible to automatically detect each textile pattern encountered during its training phase, present in the three-dimensional image acquired.

If the textile pattern is a known textile pattern, the artificial neural network makes it possible to automatically detect occurrences of this textile pattern in the reinforcement of a composite material.

If the textile pattern is a textile pattern present in the theoretical textile geometry, the artificial neural network makes it possible to detect occurrences of this textile pattern in the reinforcement of a composite material. Thus, by comparing the position of each occurrence of the textile pattern with the corresponding position in the theoretical textile geometry, it is possible to check conformity of the textile geometry of the reinforcement with the corresponding theoretical textile geometry and to identify possible textile defects and their positions. This comparison can be carried out manually or automatically.

The search method according to the invention thus enables detection of possible textile defects in an accurate manner with respect to a visual inspection method.

Further to the characteristics just discussed in the preceding paragraph, the method according to the first aspect of the invention may have one or more additional characteristics from among the following, considered individually or according to any technically possible combinations.

According to an alternative embodiment, the artificial neural network is a multilayer perceptron or a convolutional artificial neural network.

According to an alternative embodiment compatible with the preceding alternative embodiment, the artificial neural network is trained in a supervised manner and the training database includes for each training composite material of a plurality of training composite materials, a three-dimensional image of the reinforcement of the training composite material, and for each textile pattern to be detected, the textile topology of the textile pattern and the location of the textile pattern in the three-dimensional image.

Thus, the artificial neural network is trained to detect in a three-dimensional image, the textile topology associated with each textile pattern to be detected.

According to a sub-alternative embodiment of the preceding alternative embodiment, the textile topology of each textile pattern to be detected is manually obtained, using mathematical morphology algorithms, an artificial neural network or dedicated software.

According to an alternative embodiment compatible with the preceding alternative embodiments, the three-dimensional image is acquired by X-ray tomography or by transmission electron microscope.

A second aspect of the invention relates to a method for automatically reconstructing the textile geometry of a reinforcement of composite material including a plurality of textile patterns, including the steps of the search method according to the first aspect of the invention for each textile pattern of the reinforcement of composite material.

Thus, it is possible to automatically obtain a complete reconstruction of the architecture of the reinforcement of composite material in which each point of the reinforcement has been associated with a known textile pattern.

A third aspect of the invention relates to a method for automatically inspecting the textile geometry of a reinforcement of composite material, including the steps of the reconstruction method according to the second aspect of the invention to obtain a reconstruction of the textile geometry of the reinforcement of composite material and a step of comparing the reconstruction of the textile geometry of the reinforcement of composite material with a theoretical textile geometry.

In this way, it is possible to automatically obtain any deviations between the textile geometry reconstructed and the theoretical textile geometry, and thus possible textile defects in the reinforcement of the composite material.

A fourth aspect of the invention relates to a calculator configured to implement the steps of the search method according to the first aspect of the invention and/or the reconstruction method according to the second aspect of the invention and/or the inspection method according to the third aspect of the invention.

A fifth aspect of the invention relates to a computer program product comprising instructions which, when the program is executed by a computer, cause the same to implement the steps of the search method according to the first aspect of the invention and/or the reconstruction method according to the second aspect of the invention and/or the inspection method according to the third aspect of the invention.

A sixth aspect of the invention relates to a computer-readable recording medium comprising instructions which, when executed by a computer, cause the same to implement the steps of the search method according to the first aspect of the invention and/or the reconstruction method according to the second aspect of the invention and/or the inspection method according to the third aspect of the invention.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 3 shows a schematic representation of a reinforcing yarn on which the skeleton of the reinforcing yarn is identified.

FIG. 4 is a block diagram illustrating the sequence of steps of a search method according to the invention.

FIG. 5 is a block diagram illustrating the sequence of steps of a reconstruction method according to the invention.

FIG. 6 is a block diagram illustrating the sequence of steps of an inspection method according to the invention.

DETAILED DESCRIPTION

Unless otherwise specified, a same element appearing in different FIGS. has a single reference.

A first aspect of the invention relates to a method for automatically searching for at least one textile pattern in a reinforcement of composite material.

The reinforcement of a composite material is a textile framework including a plurality of reinforcing yarns, also called rovings or strands.

The reinforcing yarns are arranged along at least one axis, called the reinforcement axis.

The reinforcement is, for example, a superposition of reinforcement plies, or reinforcement layers, each comprising a plurality of reinforcing yarns.

Figure 1:
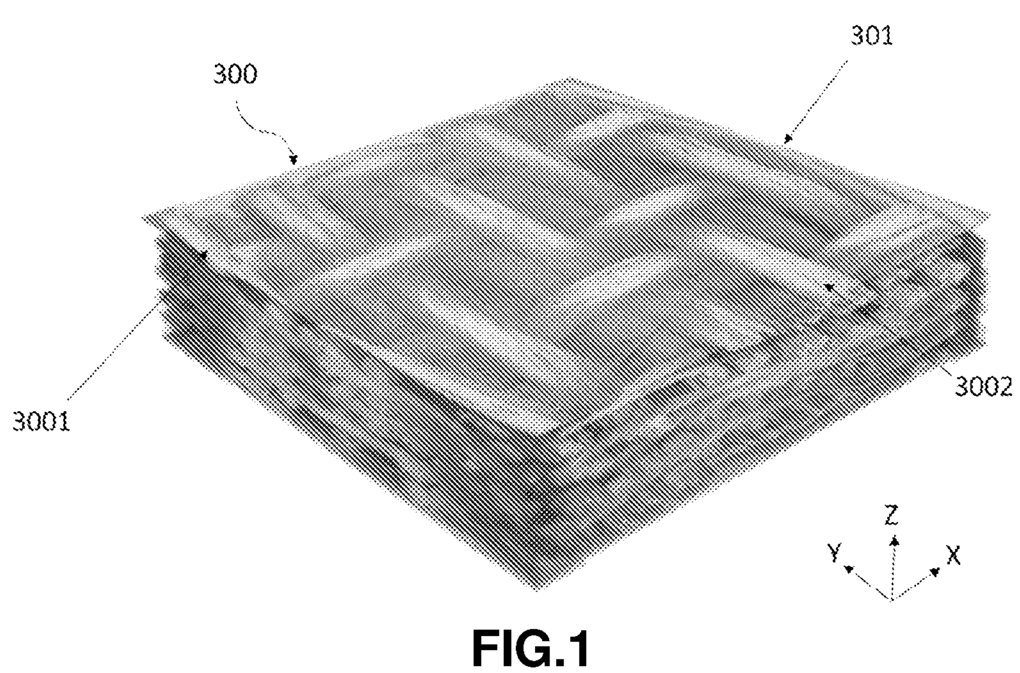
FIG. 1 shows a three-dimensional image of a reinforcement of composite material.

FIG. 1 shows a three-dimensional image 301 of the reinforcement 300 of a composite material.

In FIG. 1, the upper reinforcing ply 3001 is made up of reinforcing yarns 3002 arranged along an axis Y and reinforcing yarns 3002 arranged along an axis X.

In FIG. 1, the reinforcement axes X and Y are substantially perpendicular, but the reinforcement plies 3001 may include reinforcing yarns 3002 arranged along reinforcement axes forming an angle different from 90°. For example, the reinforcement axes X, Y may form an angle of 45°.

In the reinforcement 300 of a composite material, the reinforcing yarns 3002 are arranged with each other to form a particular textile geometry including a plurality of textile patterns.

Figure 2:
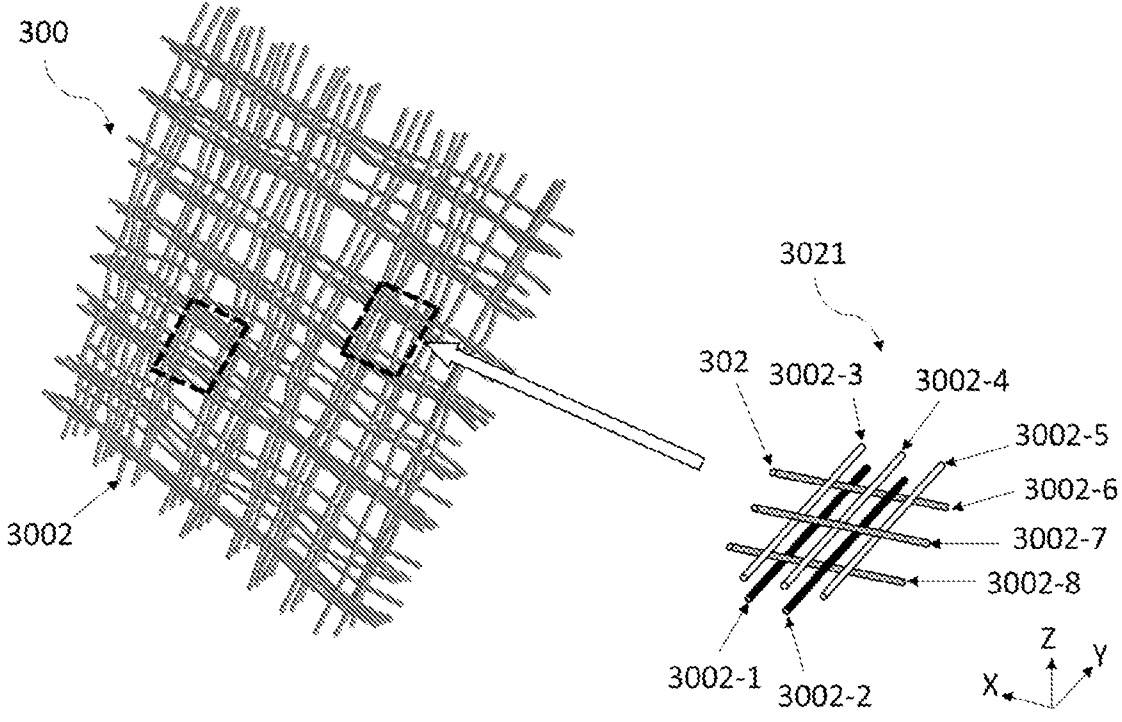
FIG. 2 shows a digital reconstruction of the architecture of a reinforcement of composite material on which a textile pattern is identified.

FIG. 2 shows a digital reconstruction of the architecture of the reinforcement 300 of a composite material on which two occurrences of a textile pattern 3021 having a textile topology 302 are identified.

By "textile pattern of a reinforcement", it is meant a geometric arrangement of a plurality of reinforcing yarns that may be repeated in the reinforcement.

A same textile pattern 3021 may therefore have several occurrences in the reinforcement 300 of a composite material.

In FIG. 2, the textile pattern 3021 includes eight reinforcing yarns 3002, two reinforcing yarns 3002-1, 3002-2 represented in black and arranged along the reinforcement axis Y, three reinforcing yarns 3002-3, 3002-4, 3002-5 represented in white and arranged along the reinforcement axis Y and three reinforcing yarns 3002-6, 3002-7, 3002-8 represented in grey and arranged along the reinforcement axis X. The reinforcing yarn 3002-3 is superimposed with the reinforcing yarn 3002-1 and the reinforcing yarn 3002-4 is superimposed with the reinforcing yarn 3002-2 along the axis Z.

Along the axis Z, the reinforcing yarns 3002-6, 3002-8 are below the reinforcing yarns 3002-2, 3002-3, 3002-4, 3002-5 and above the reinforcing yarn 3002-1, and the reinforcing yarn 3002-7 is above the reinforcing yarns 3002-1, 3002-2, 3002-3, 3002-4, 3002-5.

In FIG. 2, the architecture of the reinforcement 300 of composite material includes two occurrences of the textile pattern 3021 identified by dotted lines.

Within a textile pattern 3021, each reinforcing yarn 3002 is arranged in a textile topology 302 corresponding to the skeleton of each reinforcing yarn 3002 of the textile pattern 3021.

FIG. 3 shows a schematic representation of a reinforcing yarn 3002 having a skeleton 3022.

As represented in FIG. 3, the skeleton 3022 of a reinforcing yarn 3002 arranged along a reinforcement axis X includes a set of points including for each section 3023 of the reinforcing yarn 3002 in a plane 3025 perpendicular to the reinforcement axis X of a plurality of sections 3023 of the reinforcing yarn 3002 in a plane 3025 perpendicular to the reinforcement axis X, a point corresponding to the barycentre 3024 of the section 3023 of the reinforcing yarn 3002, each plane 3025 being parallel and not the same as the other planes 3025.

The skeleton 3022 of a reinforcing yarn 3002 may be discrete, or continuous. In the latter case, the skeleton 3022 corresponds to an interpolation passing through all points of the set of points.

A textile pattern 3021 may, for example, be manufactured by braiding, sewing, z-pinning, or even tufting.

A textile pattern 3021 may correspond to a particular textile defect.

The method according to the first aspect of the invention makes it possible to obtain, for each textile pattern 3021 to be searched, the number of textile patterns 3021 detected and their location or position, in the reinforcement 300 of the composite material.

FIG. 4 is a block diagram illustrating the sequence of steps of the search method 100 according to the invention.

A first step 101 of the method 100 consists in acquiring a three-dimensional image 301 of the reinforcement 300 of the composite material.

The three-dimensional image 301 is acquired, for example, by X-ray tomography or by transmission electron microscope with a resolution of, for example, from 1 to 400 μm preferably from 10 to 200 μm.

In FIG. 4, the three-dimensional image 301 of the reinforcement 300 of a composite material is acquired by X-ray tomography.

A second step 102 of the method 100 consists in using an artificial neural network trained on a training database, to detect each textile pattern 3021 to be searched present in the three-dimensional image 301 acquired in the first step 101.

An artificial neural network includes at least one layer of artificial neurons each including at least one artificial neuron. The artificial neurons of the artificial neural network are connected to each other by synapses and each synapse is assigned a synaptic coefficient.

The artificial neural network is for example a multilayer perceptron or a convolutional artificial neural network, such as the artificial neural network U-net, and in particular the artificial neural networks U-net 2D or U-net 3D.

The training allows the artificial neural network to be trained to a predefined task, by updating the synaptic coefficients so as to minimise the error between the output piece of data provided by the artificial neural network and the actual output piece of data, that is what the artificial neural network should output to fulfil the predefined task on an input piece of data.

The training of the artificial neural network is for example supervised. In this case, the training database includes input data, each associated with an actual output piece of data.

The function of the artificial neural network is to detect each textile pattern 3021 to be detected present in the three-dimensional image 301 previously acquired.

The training database thus includes three-dimensional images 301 of a plurality of training composite materials, as well as data on the textile topology 302 and position of each textile pattern 3021 to be detected in each three-dimensional image 301 of the training database.

The data includes, for example, the three-dimensional coordinates of each point of the set of points included in the skeleton 3022 of each reinforcing yarn 3002 of the textile pattern 3021.

The textile topology 302 of a textile pattern 3021 is for example manually obtained, using mathematical morphology algorithms, an artificial neural network, or dedicated software, such as textile modelling software, such as TexGen, WiseTex, or Multifil, or textile geometry random generation software.

The one or more training composite materials may be the same as or different from the composite material in the reinforcement 300 from which at least one textile pattern 3021 of the reinforcement 300 is to be searched.

By virtue of the search method 100 according to the invention, it is possible to detect each occurrence of at least one textile pattern 3021 in the reinforcement 300 of a composite material before assembling with the matrix or after assembling with the matrix of the composite material.

The three-dimensional images 301 of the training database may thus be three-dimensional images 301 of reinforcements 300 of composite materials before assembling with their matrices and/or three-dimensional images 301 of reinforcements 300 of composite materials after assembling with their matrices.

A second of the invention relates to a method for automatically reconstructing the textile geometry of the reinforcement 300 of composite material.

FIG. 5 is a block diagram illustrating the sequence of steps of the reconstruction method 200 according to the invention.

By "reconstruction of the textile geometry of the reinforcement of a composite material", it is meant obtaining a digital model of the architecture of the reinforcement of the composite material in which each textile pattern has been identified.

The reconstruction method 200 according to the invention includes the steps 101, 102 of the search method 100 according to the invention for each textile pattern 3021 of the reinforcement 300 of composite material.

In FIG. 5, the method 200 includes steps 101, 102 of the method 100 three times.

A third of the invention relates to a method for automatically inspecting the textile geometry of the reinforcement 300 of composite material.

FIG. 6 is a block diagram illustrating the sequence of steps of the inspection method 400 according to the invention.

The inspection method 400 according to the invention includes the steps of the reconstruction method 200 according to the invention for obtaining a reconstruction of the textile geometry of the reinforcement 300 of composite material.

The inspection method 400 according to the invention then includes a step 401 of comparing the reconstruction of the textile geometry of the reinforcement 300 of composite material previously obtained with a theoretical textile geometry.

By "theoretical textile geometry", it is meant the model or pattern on the basis of which the reinforcement 300 of composite material is made and with which the reinforcement 300 of composite material has to conform.

The step 401 of comparing the reconstruction of the textile geometry of the reinforcement 300 of composite material previously obtained with the theoretical textile geometry thus makes it possible to test conformity of the reinforcement 300 of composite material and to detect possible textile defects.

The search method 100, the reconstruction method 200 and the inspection method 400 are automatic, that is they are implemented by a calculator.

The invention claimed is:

1. A computer implemented method for automatically inspecting the textile geometry of a reinforcement of composite material including a plurality of textile patterns, each textile pattern comprising a plurality of reinforcing yarns arranged according to a textile topology, the method comprising:

reconstructing the textile geometry of the reinforcement of the composite material, which comprises searching, using an artificial neural network trained, in a supervised manner, on a training database to detect the given textile pattern in a three-dimensional image of the reinforcement of composite material, for the given textile pattern in the three-dimensional image acquired, the training database including, for each training composite material of a plurality of training composite materials, a three-dimensional image of the reinforcement of the training composite material, and for each textile pattern to be detected, the textile topology of the textile pattern and the location of the textile pattern in the three-dimensional image, and comparing the reconstruction of the textile geometry of the reinforcement of composite material with a theoretical textile geometry.

2. The computer implemented method according to claim 1, wherein the artificial neural network is a multilayer perceptron or a convolutional artificial neural network.

3. The computer implemented method according to claim 1, wherein the textile topology of each textile pattern to be detected is manually obtained, using mathematical morphology algorithms, an artificial neural network or dedicated software.

4. The computer implemented method according to claim 1, wherein the three-dimensional image is acquired by X-ray tomography or by transmission electron microscope.

5. A calculator configured to implement the computer implemented method according to claim 1.

6. A non-transitory computer-readable recording medium comprising instructions which, when executed by a computer, cause the same to implement the computer implemented method according to claim 1.

* * * * *